(12) United States Patent
Shapiro et al.

(10) Patent No.: US 9,819,038 B2
(45) Date of Patent: Nov. 14, 2017

(54) FUEL CELL REFORMING SYSTEM WITH CARBON DIOXIDE REMOVAL

(71) Applicant: General Electric Company, Schenectady, NY (US)

(72) Inventors: Andrew Philip Shapiro, Schenectady, NY (US); Robert James Perry, Niskayuna, NY (US); Matthew Joseph Alinger, Delmar, NY (US); Bruce Philip Biederman, Old Greenwich, CT (US); Irfan Saif Hussaini, Glenville, NY (US); Irina Spiry, Gloversville, NY (US)

(73) Assignee: General Electric Company, Niskayuna, NY (US)

(*) Notice: Subject to any disclaimer, the term of this patent is extended or adjusted under 35 U.S.C. 154(b) by 405 days.

(21) Appl. No.: 13/907,647

(22) Filed: May 31, 2013

(65) Prior Publication Data

US 2013/0260268 A1 Oct. 3, 2013

Related U.S. Application Data

(63) Continuation-in-part of application No. 13/077,066, filed on Mar. 31, 2011, now abandoned.

(51) Int. Cl.
*H01M 8/06* (2016.01)
*H01M 8/0668* (2016.01)
(Continued)

(52) U.S. Cl.
CPC ..... *H01M 8/0668* (2013.01); *H01M 8/04007* (2013.01); *H01M 8/0612* (2013.01);
(Continued)

(58) Field of Classification Search
CPC ..... H01M 2008/1293; H01M 2250/40; H01M 2250/402; H01M 2250/407;
(Continued)

(56) References Cited

U.S. PATENT DOCUMENTS 4,899,544 A * 2/1990 Boyd .............................. 60/618
6,311,650 B1 * 11/2001 Lamm .............................. 123/3
(Continued)

FOREIGN PATENT DOCUMENTS

EP 0468699 B1 5/1994
JP 61129410 A 6/1986
(Continued)

OTHER PUBLICATIONS

Krumpelt et al., "Advanced Fuel Cell Concepts for the 0. 1 to 100 MW Range", Journal Name: Proc. Am. Power Conf.; (United States); Journal vol. 45; Conference: American Power Conference, Chicago, IL, USA, Apr. 18, 1983, Issue Date: Feb. 8, 2008, OSTI Identifier: 6620767.

(Continued)

*Primary Examiner* — Nicholas P D'Aniello
*Assistant Examiner* — Ling R Zeng
(74) *Attorney, Agent, or Firm* — Pabitra K. Chakrabarti

(57) ABSTRACT

A power generation system includes a fuel cell including an anode that generates a tail gas. The system also includes a hydrocarbon fuel reforming system that mixes a hydrocarbon fuel with the fuel cell tail gas and to convert the hydrocarbon fuel and fuel tail gas into a reformed fuel stream including $CO_2$. The reforming system further splits the reformed fuel stream into a first portion and a second portion. The system further includes a $CO_2$ removal system coupled in flow communication with the reforming system. The system also includes a first reformed fuel path coupled to the reforming system. The first path channels the first
(Continued)

Figure 1:
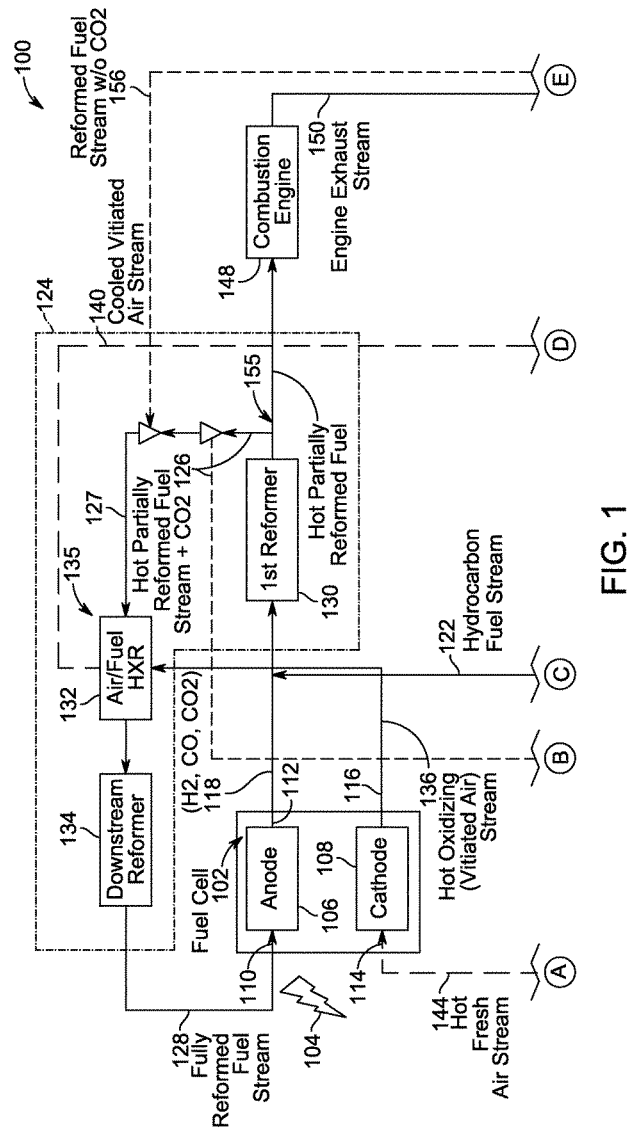

portion of the reformed fuel stream to an anode inlet. The system further includes a second reformed fuel path coupled to the reforming system. The second path channels the second portion of the reformed fuel stream to the $CO_2$ removal system.

4 Claims, 2 Drawing Sheets

(51) Int. Cl.
*H01M 8/0612* (2016.01)
*H01M 8/0662* (2016.01)
*H01M 8/04007* (2016.01)
*H01M 8/124* (2016.01)

(52) U.S. Cl.
CPC .. *H01M 8/0662* (2013.01); *H01M 2008/1293* (2013.01); *H01M 2250/40* (2013.01); *H01M 2250/402* (2013.01); *H01M 2250/407* (2013.01); *Y02B 90/12* (2013.01); *Y02E 60/56* (2013.01); *Y02E 60/563* (2013.01); *Y02P 90/40* (2015.11)

(58) Field of Classification Search
CPC ........... H01M 8/04007; H01M 8/0612; H01M 8/0662; H01M 8/0668; Y02B 90/12; Y02E 60/50; Y02E 60/525; Y02E 60/56; Y02E 60/563
See application file for complete search history.

(56) References Cited

U.S. PATENT DOCUMENTS

| | | |
|---|---|---|
| 6,868,677 B2 | 3/2005 | Viteri et al. |
| 7,410,713 B2 | 8/2008 | Balan et al. |
| 7,428,816 B2 | 9/2008 | Singh et al. |
| 7,931,994 B2 | 4/2011 | Kamihara |
| 8,092,943 B2 | 1/2012 | Blaszczyk et al. |
| 2002/0098394 A1 | 7/2002 | Keefer et al. |
| 2003/0094396 A1 | 5/2003 | Saitou et al. |
| 2004/0124308 A1 | 7/2004 | Daggett |
| 2004/0229102 A1* | 11/2004 | Jahnke et al. ................. 429/34 |
| 2005/0106429 A1* | 5/2005 | Keefer ................ H01M 8/0625 429/410 |
| 2005/0266293 A1 | 12/2005 | Delzanno et al. |
| 2006/0066108 A1 | 3/2006 | Willets et al. |
| 2006/0182680 A1 | 8/2006 | Keefer et al. |
| 2009/0155647 A1 | 6/2009 | Cui et al. |
| 2009/0214902 A1 | 8/2009 | Pelman et al. |
| 2010/0028730 A1 | 2/2010 | Ghezel-Ayagh et al. |
| 2010/0291455 A1 | 11/2010 | Biederman et al. |
| 2011/0120137 A1 | 5/2011 | Ennis |
| 2012/0251898 A1 | 10/2012 | Lehar et al. |
| 2012/0251899 A1 | 10/2012 | Lehar et al. |
| 2012/0304640 A1 | 12/2012 | Tsuyuki |

FOREIGN PATENT DOCUMENTS

| | | |
|---|---|---|
| JP | 11238520 A | 8/1999 |
| JP | 2002124283 A | 4/2002 |
| JP | 2003120427 A | 4/2003 |
| JP | 2003282118 A | 10/2003 |
| JP | 2006107945 A | 4/2006 |
| JP | 2007031255 A | 2/2007 |
| JP | 2008506819 A | 3/2008 |
| JP | 2008180131 A | 8/2008 |
| RU | 2239931 C2 | 11/2004 |
| WO | 2011028808 A2 | 3/2011 |

OTHER PUBLICATIONS

Unofficial English translation of Office Action issued in connection with corresponding JP Application No. 2014-502728 dated Mar. 1, 2016.
Russian Notice of Allowance issued in connection with related RU Application No. 2013143397 dated Jul. 27, 2016.
Non-Final Office action issued in Connection with related U.S. Appl. No. 15/062,753 dated Sep. 21, 2016.
Final Office action issued in Connection with related U.S. Appl. No. 15/062,753 dated May 8, 2017.

* cited by examiner

FUEL CELL REFORMING SYSTEM WITH CARBON DIOXIDE REMOVAL

CROSS REFERENCE TO RELATED APPLICATIONS

This application is a continuation-in-part of U.S. patent application Ser. No. 13/077,066, filed on Mar. 31, 2011, entitled "Solid-Oxide Fuel Cell High-Efficiency Reform-and-Recirculate System," which is incorporated by reference herein in its entirety.

BACKGROUND

The field of the disclosure relates generally to combined cycle fuel cell systems and, more particularly, to fuel cell carbon dioxide ($CO_2$) removal systems and methods of operation thereof.

Fuel cells are electrochemical energy conversion devices that have demonstrated a potential for relatively high efficiency and low pollution in power generation. A fuel cell generally provides a direct current (DC) which may be converted to alternating current (AC) through, e.g., an inverter. The DC or AC voltage can be used to power motors, lights, and any number of electrical devices and systems. Fuel cells may operate in stationary, semi-stationary, or portable applications.

Certain fuel cells, such as solid oxide fuel cells (SOFCs), may operate in large-scale power systems that provide electricity to satisfy industrial and municipal needs. Others may be useful for smaller portable applications such as e.g., powering cars. Other common types of fuel cells include phosphoric acid (PAFC), molten carbonate (MCFC), and proton exchange membrane (PEMFC), all generally named after their electrolytes.

A fuel cell produces electricity by electrochemically combining a fuel and an oxidant across an ionic conducting layer. This ionic conducting layer, also labeled the electrolyte of the fuel cell, may be a liquid or solid. Fuel cells are typically amassed in electrical series in an assembly of fuel cells to produce power at useful voltages or currents. Therefore, interconnect structures may be used to connect or couple adjacent fuel cells in series or parallel. In general, components of a fuel cell include the electrolyte and two electrodes, i.e., an anode and a cathode. The reactions that produce electricity generally take place at the electrodes where a catalyst is typically disposed to speed the reactions. The electrodes may be constructed as, e.g., channels and porous layers to increase the surface area for the chemical reactions to occur. The electrolyte carries electrically charged particles from one electrode to the other and is otherwise substantially impermeable to both fuel and oxidant.

The opportunity for a power generation system that can benefit greatly from the integration of a fuel cell and a combustion apparatus derives in large part from the electrochemistry of the fuel cell. Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) of carbon-based feedstocks, such as reforming of the more readily available natural gas and other hydrocarbon fuels and feedstocks. Examples of hydrocarbon fuels include natural gas, methane, ethane, propane, methanol, syngas, and other hydrocarbons.

The reforming of hydrocarbon fuel to produce hydrogen to feed the electrochemical reaction may be incorporated with the operation of the fuel cell. Moreover, such reforming may occur internal and/or external to the fuel cell. For reforming of hydrocarbons performed external to the fuel cell, the associated external reformer may be positioned remote from or adjacent to the fuel cell. The reformed fuel may be channeled to the inlet of the anode to facilitate further supplying hydrogen fuel to the fuel cell. A portion of the reformed fuel may be channeled to a combustion engine for further electric power generation.

Fuel cell systems that can reform hydrocarbon internal and/or adjacent to the fuel cell may offer advantages, such as simplicity in design and operation. For example, the steam reforming reaction of hydrocarbons is typically endothermic, and therefore, internal reforming within the fuel cell or external reforming in an adjacent reformer may utilize the heat generated by the typically exothermic electrochemical reactions of the fuel cell. Furthermore, catalysts active in the electrochemical reaction of hydrogen and oxygen within the fuel cell to produce electricity may also facilitate internal reforming of hydrocarbon fuels. In SOFCs, for example, if nickel catalyst is disposed at an electrode, e.g., the anode to sustain the electrochemical reaction, the active nickel catalyst may also reform hydrocarbon fuel into hydrogen and carbon monoxide (CO). Moreover, both hydrogen and CO may be produced when reforming hydrocarbon feedstock. Thus, fuel cells, such as SOFCs, that can utilize CO as fuel (in addition to hydrogen) are generally more attractive candidates for utilizing reformed hydrocarbon and for internal and/or adjacent reforming of hydrocarbon fuel.

As described previously, the exhaust components from fuel cells that operate at high temperatures can be directed to turbines and other types of engines, as part of a general combined cycle system. However, some known combined cycle systems that include fuel cells facilitate energy losses in the form of heat losses such that fuel cells routinely achieve a conversion efficiency that is only about 50%.

In addition to hydrogen and CO, internal fuel cell reforming may generate carbon dioxide ($CO_2$) that is entrained in the reformed fuel stream. As the combined cycle system is scaled upward, generating sufficient reformed fuel to fire a combustion engine will increase the amount of $CO_2$ generated. Excess $CO_2$ in the reformed fuel stream may adversely affect operation of the fuel cells and combustion engines.

BRIEF DESCRIPTION

In one aspect, a power generation system is provided. The system utilizes a fuel cell that includes an anode configured to generate a tail gas. The anode includes an inlet and an outlet. The system also includes a hydrocarbon fuel reforming system configured to mix a hydrocarbon fuel with the fuel cell tail gas downstream of the fuel cell and to at least partially convert the hydrocarbon fuel and fuel tail gas into a reformed fuel stream including carbon dioxide ($CO_2$). The hydrocarbon fuel reforming system is further configured to split the reformed fuel stream into a first portion and a second portion. The system further includes a $CO_2$ removal system coupled in flow communication with the hydrocarbon fuel reforming system. The system also includes a first reformed fuel path coupled to the hydrocarbon fuel reforming system. The first fuel path is configured to channel the first portion of the reformed fuel stream to the fuel cell anode inlet. The system further includes a second reformed fuel path coupled to the hydrocarbon fuel reforming system and the first reformed fuel path. The second reformed fuel path is configured to channel the second portion of the reformed fuel stream to the $CO_2$ removal system.

In a further aspect, a method of generating electric power with a power generation system utilizing a fuel cell is provided. The method includes channeling a fuel to an inlet of a fuel cell anode. The method also includes generating a tail gas stream including carbon dioxide ($CO_2$) in the fuel cell anode and discharging the tail gas stream from an outlet of the fuel cell anode. The method further includes channeling the tail gas stream to a hydrocarbon fuel reforming system. The method also includes mixing a hydrocarbon fuel with the tail gas stream to form a fuel/tail gas mixture stream. The method further includes at least partially converting the fuel/tail gas mixture stream into a reformed fuel stream including $CO_2$. The method also includes splitting the reformed fuel stream into a first portion and a second portion. The method further includes channeling the first portion of the reformed fuel stream to the inlet of the fuel cell anode. The method also includes channeling the second portion of the reformed fuel stream to a $CO_2$ removal system.

In another aspect, a solvent-based $CO_2$ removal system for a power generation system utilizing a fuel cell is provided. The solvent-based $CO_2$ removal system includes a solvent-based $CO_2$ absorber coupled in flow communication with a fuel cell anode inlet and a fuel cell anode outlet. The system also includes a solvent regeneration system coupled in flow communication with the solvent-based $CO_2$ absorber.

DRAWINGS

Figure 2:
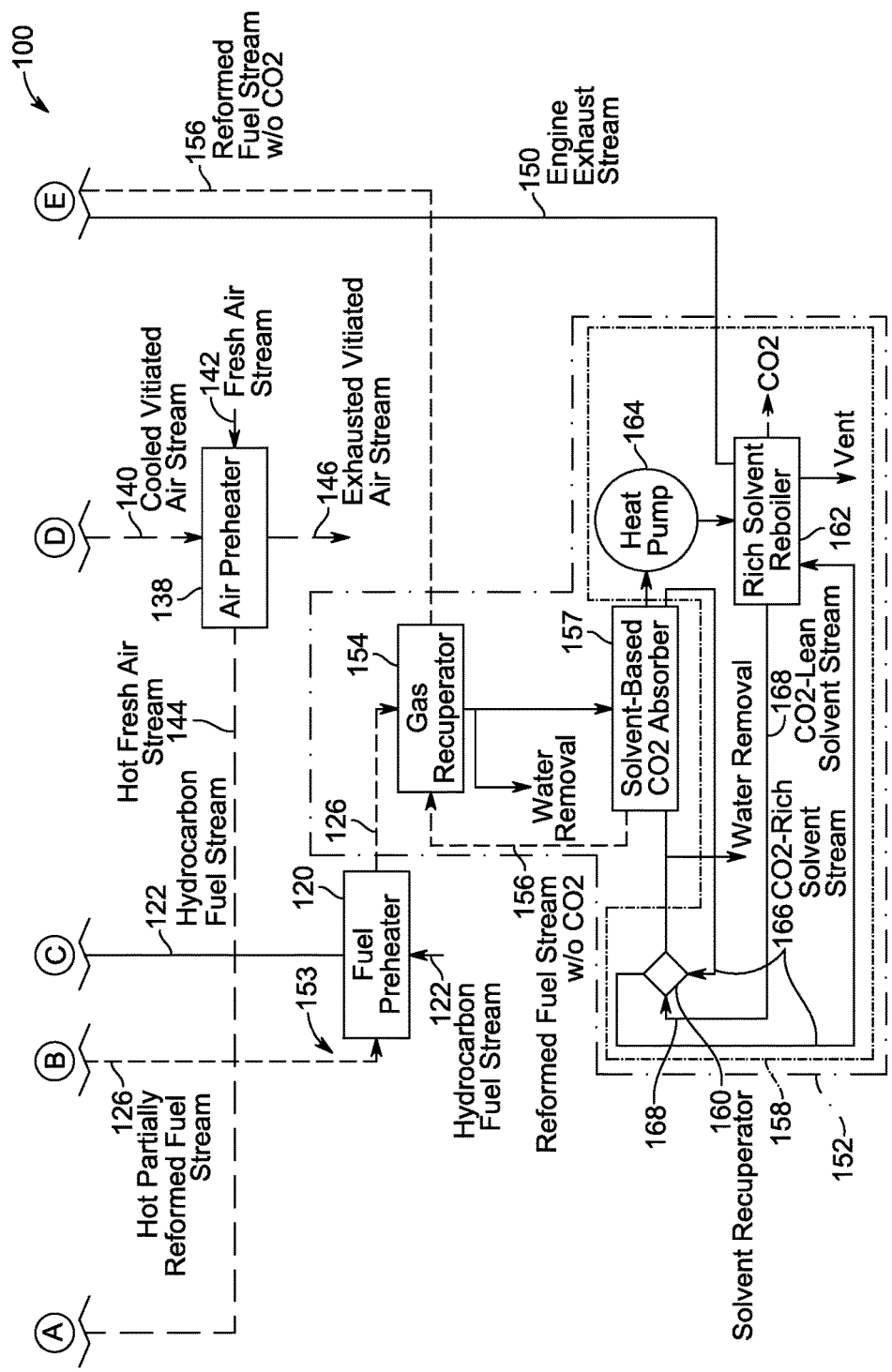

These and other features, aspects, and advantages of the present disclosure will become better understood when the following detailed description is read with reference to the accompanying drawings in which like characters represent like parts throughout the drawings, wherein:

FIG. 1 is a schematic view of an exemplary combined cycle power plant that includes a fuel cell; and FIG. 2 is a continuation of FIG. 1.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The carbon dioxide ($CO_2$) removal systems embedded within the fuel cell reforming-and-recirculating systems described herein provide a cost-effective method for generating electric power. The embodiments described herein facilitate increased thermal efficiency through heat recovery. The embodiments described herein also facilitate decreased $CO_2$ discharge through methods and equipment that include, e.g., and without limitation, solvent-based $CO_2$ absorption. Specifically, the devices, systems, and methods described herein include a system of fuel recirculation and heat recovery devices that facilitate increased utilization of the fuel in the anode of the fuel cell. Also, the devices, systems, and methods described herein facilitate heat recovery from the fuel cell reformation, a combustion engine exhaust, and the $CO_2$ absorption process. Moreover, the devices, systems, and methods described herein further facilitate increased thermal efficiency through reducing reliance on additional parasitic loads, i.e., without introducing increased auxiliary power loads. Therefore, overall plant efficiencies may exceed 65% for at least some of the embodiments described herein. Furthermore, the devices, systems, and methods described herein are scalable to any electric power output rating, including large-scale centralized power generation and local or distributed generation. In addition, the $CO_2$ removal systems and the fuel cell reforming-and-recirculating systems described herein may be used with solid oxide fuel cells (SOFCs) and molten carbonate fuel cells (MCFCs).

FIG. 1 is a schematic view of an exemplary electric power generation system, e.g., a combined cycle power plant 100 that includes a fuel cell 102. FIG. 2 is a continuation of FIG. 1. Fuel cell 102 is one of a solid oxide fuel cell (SOFC) and a molten carbonate fuel cell (MCFC). Fuel cell 102 generates direct current (DC) electric power 104 by electrochemically combining a fuel and an oxidant (both discussed further below) across an ionic conducting layer (not shown). The ionic conducting layer, i.e., the electrolyte of fuel cell 102, may be a liquid or solid. Fuel cell 102 may be positioned in electrical series in an assembly of fuel cells 102 (only one shown in FIG. 1) to produce power at useful voltages or currents. Fuel cell includes the electrolyte and two electrodes, i.e., an anode 106 and a cathode 108. The electrochemical reactions that produce DC electricity 104 generally take place at electrodes 106 and 108 where a catalyst (not shown) is disposed to speed the reactions. Electrodes 106 and 108 may be constructed as, e.g., and without limitation, channels and porous layers (neither shown) to increase the surface area for the chemical reactions to occur. The electrolyte carries electrically charged particles from one electrode to the other and is otherwise substantially impermeable to both fuel and oxidant. Anode 106 includes an inlet 110 and an outlet 112. Cathode 108 includes an inlet 114 and an outlet 116. Anode 106 discharges a tail gas stream 118 from anode outlet 112 that includes water, hydrogen, carbon monoxide (CO), carbon dioxide ($CO_2$), and unreacted fuel, if any.

Combined cycle power plant 100 also includes a fuel preheater 120 coupled in flow communication with anode outlet 112. Fuel preheater 120 is coupled in flow communication with a carbonaceous, i.e., hydrocarbon fuel source (not shown) that, in the exemplary embodiment, channels natural gas stream 122 to fuel preheater 120. Alternatively, any fuel that enables operation of combined cycle power plant 100 and fuel cell 102 may be used.

Combined cycle power plant 100 further includes a hydrocarbon fuel reforming system 124 configured to mix natural gas stream 122 with tail gas stream 118 downstream of fuel cell anode outlet 112. Hydrocarbon fuel reforming system 124 also converts natural gas stream 122 with entrained tail gas stream 118 into a partially reformed fuel stream 126 including $CO_2$, and a substantially fully reformed fuel stream 128.

Hydrocarbon fuel reforming system 124 includes a first reformer 130 that is coupled to fuel cell anode outlet 112 and fuel preheater 120. First reformer 130 receives natural gas stream 122 with entrained tail gas stream 118 and coverts them to a hot partially reformed fuel stream 126 including $CO_2$. Hydrocarbon fuel reforming system 124 also includes an air/fuel heat exchanger 132 coupled in flow communication with first reformer 130. Air/fuel heat exchanger 132 receives a portion of hot partially reformed fuel stream 127 with at least a portion of $CO_2$ removed and transfers heat from another fluid stream (discussed further below) to stream 127 to continue to increase the heat content of stream 127. Hydrocarbon fuel reforming system 124 further includes at least one downstream reformer 134 coupled in flow communication with air/fuel heat exchanger 132 and fuel cell anode inlet 110. Downstream reformer 134 is configured to substantially complete reformation of hot reformed fuel stream 127 into fully reformed fuel stream 128 prior to channeling into fuel cell anode 106. Therefore, combined cycle power plant 100 defines a first reformed fuel path 135 that includes air/fuel heat exchanger 132 and downstream reformer 134.

In at least some alternative embodiments of hydrocarbon fuel reforming system 124, first reformer 130 is the only reformer and it substantially completes reformation of hot reformed fuel stream 127 or stream 126 into fully reformed fuel stream 128 prior to channeling into fuel cell anode 106. Also, in at least some alternative embodiments of hydrocarbon fuel reforming system 124, a plurality of strings of first reformer 130-heat exchanger 132-reformer 134 are coupled in a serialized and/or parallel configuration. Each heat exchanger 132 may also be referred to as a "booster" heat exchanger that is used to counter the otherwise tendency for the decrease in temperature of streams 126, 127, and 128 due to the endothermic nature of the reforming reaction. Moreover, alternatively, air/fuel heat exchanger 132 may be integrated into downstream reformer 134 to define a unity device.

Combined cycle power plant 100 also includes fuel cell anode outlet 116 coupled to air/fuel heat exchanger 132 to transfer heat from a hot oxidizing stream 136 to hot partially reformed fuel stream 127. In the exemplary embodiment, stream 136 includes vitiated air, i.e., air depleted of oxygen. Air/fuel heat exchanger 132 is coupled in flow communication with an air preheater 138 such that a cooled vitiated air stream 140 discharged from heat exchanger 132 is channeled to air preheater 138. A fresh air stream 142 is channeled through air preheater 138 and residual heat is transferred from cooled vitiated air stream 140 to fresh air stream 142 to produce a hot fresh air stream 144 that is channeled to fuel cell cathode inlet 114. Exhausted vitiated air stream 146 is vented.

Combined cycle power plant 100 further includes a bottoming, i.e., low temperature cycle, i.e., a combustion engine 148 coupled in flow communication with first reformer 130. Hot reformed fuel 126 with entrained $CO_2$ is channeled to combustion engine 148 that may include, for example, without limitation, a reciprocating 4-stroke engine, reciprocating 2-stroke engine, an opposed piston 2-stroke engine, or a gas turbine engine. Combustion engine 148 may be mechanically coupled to an electric power generator or other load, e.g., without limitation, a pump and a compressor. Combustion engine 148 generates an engine exhaust stream 150 that includes residual heat that may be used as described further below.

Combined cycle power plant 100 also includes a solvent-based $CO_2$ removal system 152 coupled in flow communication with hydrocarbon fuel reforming system 124. Hydrocarbon fuel reforming system 124 is configured to split hot reformed fuel stream 126 with entrained $CO_2$ into a first portion and a second portion. The first portion of stream 126 including partially reformed fuel stream 127 is channeled toward air/fuel heat exchanger 132 through first reformed fuel path 135. The second portion of hot reformed fuel stream 126 with entrained $CO_2$ is channeled toward fuel preheater 120. Fuel preheater 120 transfers heat into natural gas stream 122 from hot reformed fuel stream 126 with entrained $CO_2$. Therefore, combined cycle power plant 100 defines a second reformed fuel path 153 that includes fuel preheater 120 and solvent-based $CO_2$ removal system 152. Combined cycle power plant 100 also defines a third reformed fuel path 155 that includes combustion engine 148.

Solvent-based $CO_2$ removal system 152 includes a gas recuperator 154 coupled in flow communication with fuel preheater 120. Gas recuperator 154 is configured to extract heat from reformed fuel stream 126 with entrained $CO_2$ after it is channeled from fuel preheater 120 and transfer the heat to another fuel stream (discussed further below). Gas recuperator 154 is also coupled in flow communication with a solvent-based $CO_2$ absorber 157 that substantially removes $CO_2$ from stream 126 to generate a reformed fuel stream 156 without $CO_2$. Stream 156 is channeled back to gas recuperator 154 for received heat from incoming stream 126 and then being channeled back to hydrocarbon fuel reforming system 124 between first reformer 130 and air/fuel heat exchanger 132 such that $CO_2$ channeled into fuel cell anode inlet 110 is substantially reduced. Water removal preferably occurs prior to admission of stream 126 into absorber 157 through a cooling device (not shown).

Solvent-based $CO_2$ removal system 152 also includes a solvent regeneration system 158 that includes a solvent recuperator 160 coupled in flow communication with a solvent-based $CO_2$ absorber 157. Solvent regeneration system 158 also includes a rich solvent reboiler 162 coupled in flow communication with solvent recuperator 160. Solvent regeneration system 158 further includes a heat pump 164 thermally coupled to rich solvent reboiler 162 and solvent-based $CO_2$ absorber 157.

In the exemplary embodiment, partially reformed fuel stream 126 with entrained $CO_2$ is channeled from fuel preheater 120 to gas recuperator 154. Heat is transferred from stream 126 to reformed fuel stream 156 without $CO_2$. Hot reformed fuel 156 without $CO_2$ is channeled from gas recuperator 154 to mix with the portion of hot partially reformed fuel stream 126 with $CO_2$ not diverted to solvent-based $CO_2$ removal system 152 to form hot partially reformed fuel stream 127 with significantly less $CO_2$ than stream 126. Cooled stream 126 with $CO_2$ is channeled from gas recuperator 154 to solvent-based $CO_2$ absorber 156. Solvent absorbs $CO_2$ from stream 126 and generates reformed fuel stream 156 without $CO_2$ that is channeled back to gas recuperator 154.

Also, in the exemplary embodiment, $CO_2$-rich solvent stream 166 is channeled from solvent-based $CO_2$ absorber 157 to solvent recuperator 160 such that heat is transferred to stream 166 from another stream (discussed further below). Heated $CO_2$-rich solvent stream 166 is channeled to rich solvent reboiler 162 that further heats and boils stream 166 to release the absorbed $CO_2$ and channel the released $CO_2$ to a collection system (not shown). A $CO_2$-lean solvent stream 168 is channeled to solvent recuperator 160 to transfer heat to $CO_2$-rich solvent stream 166 prior to stream 168 being channeled back to solvent-based $CO_2$ absorber 157 to repeat the cycle. The thermal source for rich solvent reboiler 162 is engine exhaust stream 150 that is vented to atmosphere upon exiting reboiler 162. Alternatively, the heat required for the reboiling operation may be supplied heat pump 164 alone or in conjunction with stream 150. In the embodiments with heat pump 164, it is disposed between solvent-based $CO_2$ absorber 157 and rich solvent reboiler 162 so that heat of $CO_2$ absorption is removed from the working solvent and pumped to the $CO_2$-loaded solvent for regeneration, thereby facilitating maintaining the working solvent cool and regenerating the $CO_2$-loaded solvent. Additional water removal from the solvent streams may also be needed prior to returning $CO_2$-lean solvent stream 168 to absorber 157 through a cooling device (not shown).

In alternative embodiments, additional apparatus and systems may be added to combined cycle power plant 100 to enhance electric power generation. For example, in some alternative embodiments a trim cooler (not shown) or other heat exchange device may be used to recover heat in solvent-based $CO_2$ removal system 152 and/or hydrocarbon fuel reforming system 124. Moreover, in some alternative embodiments, an Organic Rankine cycle (ORC) (not shown) may be used to receive engine exhaust stream 150, diverted hot partially reformed fuel stream 126 with $CO_2$, and/or hot partially reformed fuel stream 127 to boil a Rankine fluid, e.g., a water-steam cycle. Engine exhaust stream 150 is then vented to atmosphere.

Also, in alternative embodiments, and regenerative $CO_2$ removal systems other than solvent-based $CO_2$ removal system 152 that enable operation of combined cycle power plant 100 as described may be used. For example, and without limitation, $CO_2$ removal systems such as solid-adsorbent $CO_2$ removal systems and pressure-swing adsorption (PSA) $CO_2$ removal systems may be used.

The above-described carbon dioxide ($CO_2$) removal systems embedded within the fuel cell reforming-and-recirculating systems described herein provide a cost-effective method for generating electric power. The embodiments described herein facilitate increased thermal efficiency through heat recovery. The embodiments described herein also facilitate decreased $CO_2$ discharge through $CO_2$ absorption. Specifically, the devices, systems, and methods described herein include a system of fuel recirculation and heat recovery devices that facilitate increased utilization of the fuel in the anode of the fuel cell. Also, the devices, systems, and methods described herein facilitate heat recovery from the fuel cell reformation, a combustion engine exhaust, and the solvent-based $CO_2$ absorption process. Moreover, the devices, systems, and methods described herein further facilitate increased thermal efficiency through reducing reliance on additional parasitic loads, i.e., without introducing increased auxiliary power loads. Therefore, overall plant efficiencies may exceed 65% for at least some of the embodiments described herein. Furthermore, the devices, systems, and methods described herein are scalable to any electric power output rating, including large-scale centralized power generation and local or distributed generation. In addition, the solvent-based carbon dioxide ($CO_2$) removal systems and the fuel cell reforming-and-recirculating systems described herein may be used with solid oxide fuel cells (SOFCs) and molten carbonate fuel cells (MCFCs).

An exemplary technical effect of the methods, systems, and apparatus described herein includes at least one of: (a) increasing a thermal efficiency of a combined cycle power plant that includes a fuel cell through heat recovery, including heat recovery from fuel cell reformation, combustion engine exhaust, and solvent-based $CO_2$ absorption; (b) decreasing $CO_2$ discharge from a combined cycle power plant that includes a fuel cell through solvent-based $CO_2$ absorption; (c) reducing an increase in auxiliary power consumption by the combined cycle power plant; and (d) increasing utilization of fuel in the anode of a fuel cell.

Exemplary embodiments of combined cycle power plants that include a fuel cell and a solvent-based carbon dioxide ($CO_2$) removal systems embedded within associated fuel cell reforming-and-recirculating systems are described above in detail. The solvent-based carbon dioxide ($CO_2$) removal systems embedded within associated fuel cell reforming-and-recirculating systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring heat recovery and $CO_2$ removal methods, and are not limited to practice with only the solvent-based $CO_2$ removal systems, fuel cell reforming-and-recirculating systems, and methods as described herein. Rather, the exemplary embodiment can be implemented and utilized in connection with many other combined cycle power plant heat recovery and $CO_2$ removal applications that are currently configured to receive and accept fuel cells, e.g., and without limitation, distributed generation facilities in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of generating electric power with a power generation system utilizing a fuel cell, said method comprising:

channeling a fuel to an inlet of a solid oxide fuel cell anode;

generating a tail gas stream including carbon dioxide ($CO_2$) in the solid oxide fuel cell anode and discharging the tail gas stream from an outlet of the fuel cell anode;

channeling the tail gas stream to a hydrocarbon fuel reforming system;

mixing a hydrocarbon fuel with the tail gas stream to form a fuel/tail gas mixture stream;

at least partially converting the fuel/tail gas mixture stream into a reformed fuel stream including $CO_2$;

splitting the reformed fuel stream including $CO_2$ into a first portion and a second portion, wherein the first portion includes a hot partially reformed fuel stream;

channeling the first portion of the reformed fuel stream including $CO_2$ to the inlet of the solid oxide fuel cell anode;

channeling the second portion of the reformed fuel stream to a $CO_2$ removal system;

wherein channeling the second portion of the reformed fuel stream including $CO_2$ to a $CO_2$ removal system comprises decreasing a $CO_2$ concentration in the first portion of the reformed fuel stream including $CO_2$ comprising:

channeling the second portion of the reformed fuel stream including $CO_2$ to a solvent-based $CO_2$ absorber;

transferring at least a portion of the $CO_2$ in the second portion of the reformed fuel stream including $CO_2$ to a $CO_2$-lean solvent stream, and forming a $CO_2$-rich solvent stream and a reformed fuel stream without $CO_2$; and channeling the reformed fuel stream without $CO_2$ into the hot partially reformed fuel stream.

2. The method in accordance with claim 1, wherein decreasing a $CO_2$ concentration in the first portion of the reformed fuel stream including $CO_2$ further comprises: channeling the $CO_2$-rich solvent stream to a rich solvent reboiler; adding heat into the rich solvent reboiler from at least one of a combustion engine exhaust stream and a heat pump.

3. The method in accordance with claim 2, wherein adding heat into the rich solvent reboiler from at least one of a combustion engine exhaust stream and a heat pump comprises:

splitting the reformed fuel stream including $CO_2$ into a third portion; and channeling the third portion of the reformed fuel stream including $CO_2$ to a combustion engine and generating the engine exhaust stream.

4. The method in accordance with claim 1, wherein decreasing a $CO_2$ concentration in the first portion of the reformed fuel stream including $CO_2$ further comprises transferring heat from the $CO_2$-lean solvent stream to the $CO_2$-rich solvent stream through a solvent recuperator, thereby preheating the $CO_2$-rich solvent stream prior to entry into the rich solvent reboiler.

* * * * *